(12) United States Patent
Resnick et al.

(10) Patent No.: US 6,295,597 B1
(45) Date of Patent: Sep. 25, 2001

(54) APPARATUS AND METHOD FOR IMPROVED VECTOR PROCESSING TO SUPPORT EXTENDED-LENGTH INTEGER ARITHMETIC

(75) Inventors: David Resnick, Eau Claire; William T. Moore, Elk Mound, both of WI (US)

(73) Assignee: Cray, Inc., Eagan, MN (US)

( * ) Notice: Subject to any disclaimer, the term of this patent is extended or adjusted under 35 U.S.C. 154(b) by 0 days.

(21) Appl. No.: 09/132,205

(22) Filed: Aug. 11, 1998

(51) Int. Cl.[7] ........................................... G06F 15/00
(52) U.S. Cl. ........................................................ 712/8
(58) Field of Search ............................. 712/22, 221, 222, 712/203, 229, 218, 200, 234, 2, 4, 7, 8, 9, 272; 708/490, 629, 707, 708, 710; 395/562; 703/26

(56) References Cited

U.S. PATENT DOCUMENTS

| | | | |
|---|---|---|---|
| 5,396,641 | 3/1995 | Iobst et al. ........................... 395/800 |
| 5,652,910 | * 7/1997 | Boutaud et al. ..................... 712/218 |
| 5,864,703 | * 6/1999 | Van Hook et al. ................... 712/22 |
| 5,966,528 | * 10/1999 | Wilkenson et al. .................. 712/222 |
| 5,991,531 | * 11/1999 | Song et al. ............................ 703/23 |

* cited by examiner

*Primary Examiner*—John A. Follansbee
(74) *Attorney, Agent, or Firm*—Schwegman, Lundberg, Woessner & Kluth, P.A.

(57) ABSTRACT

An apparatus and a method for extended-precision vector arithmetic capable of extremely long precision (i.e., precision to as many bits as a user desires or is limited to due to memory, disk-storage, or other resource constraints). Vector carry-out bits can be used as vector carry-in bits for successive operations. In performing add or subtract operations on integers that are longer than the word size of the computer, the operands a broken into word-sized parts which are used as operands. A vector of long-integer numbers is thus broken into a series of sub-vectors, each having word-sized elements. Vector add or subtract operations are performed successively on the sub-vectors, starting with the lowest-order sub-vectors. Carry-out (or borrow-out) bits from a first vector operation are used as carry-in (or borrow-in) bits for a successive vector operation. In one embodiment, instructions are added to the instruction set of a vector processor to assist in propagating carry (or borrow) bits between components of long operands, and to assist users in accessing and controlling the carry (or borrow) bits.

33 Claims, 7 Drawing Sheets

APPARATUS AND METHOD FOR IMPROVED VECTOR PROCESSING TO SUPPORT EXTENDED-LENGTH INTEGER ARITHMETIC

FIELD OF THE INVENTION

This invention relates to the field of vector processor computers, and more specifically to a method and apparatus of long/extended-length integer arithmetic using an improved vector processor.

BACKGROUND OF THE INVENTION

Extended-length (or "long") integer arithmetic is arithmetic that provides a number of significant bits (precision) that significantly exceeds the native, built-in capabilities of the computer being used. For example, a sixteen-bit processor can be used to handle arithmetic for the much larger numbers needed for scientific or financial spreadsheets or other calculations. An addition, for example, typically involves loading the lowest 16 bits from each operand in memory into internal registers, adding them together, storing the result into a result field in memory, then loading the next-significant 16 bits from each operand in memory into internal registers, adding them together along with the propagated carry from the first operation, storing the second result into the next-significant 16 bits of the result field in memory, and so on until the desired number of bits has been added, while propagating the carry from each operation into the next operation.

When taken to great lengths, such extended-length arithmetic can be used to compute pi to a million digits (for example), or for other desired applications carried out to as many significant bits as the programmer desires (within limits imposed by the storage capabilities of the computer and the time needed for the operations).

Vector processors have been used to improve the performance of a number of very-high-end computing applications such as weather forecasting and finite-element analysis. Many such applications use floating-point numbers and operations since they require only a correct magnitude (called the exponent) and a certain number of significant bits (called the mantissa or fraction). Therefore, many vector processors have been optimized for floating-point registers and operations. While suitable for many applications, floating-point operations are not suitable for applications requiring exact precision to hundreds or thousands of bits.

What is needed is improvements to the architecture and methods for vector processors and vector processing to improve extended-length (or "long") integer arithmetic.

SUMMARY OF THE INVENTION

An apparatus and a method for extended-precision vector arithmetic is described capable of extremely long precision (i.e., precision to as many bits as a user desires or is limited to due to memory, disk-storage, or other resource constraints). Vector carry-out bits can be used as vector carry-in bits for successive operations.

In performing add or subtract operations on integers that are longer than the word size of the computer, the operands are broken into word-sized parts which are used as operands. A vector of long-integer numbers is thus broken into a series of sub-vectors, each having word-sized elements. Vector add or subtract operations are performed successively on the sub-vectors, starting with the lowest-order sub-vectors. Carry-out (or borrow-out) bits from a first vector operation are used as carry-in (or borrow-in) bits for a successive vector operation. In one embodiment, instructions are added to the instruction set of a vector processor to assist in propagating carry (or borrow) bits between components of long operands, and to assist users in accessing and controlling the carry (or borrow) bits.

One embodiment provides vector computer that includes a memory and an input-output subsystem including magnetic disk drives. The computer also includes vector element registers. Each vector element register can be selectively loaded with data from the memory. Each vector element register includes N elements, and each element has a plurality of bits. The computer also includes a vector carry register that has N bits. The computer also includes a vector arithmetic or logical functional unit having an input coupled to receive data operands from the respective elements of two vector element registers and the vector carry register, and operable to produce a result, wherein the result has successive elements and carry-out bits, and wherein each element of the result is based on an element from the first vector element register, a corresponding element from the second vector element register, and a corresponding bit from the vector carry register. A controller associated with the vector registers is responsive to program instructions to successively transmit one or more corresponding elements from each of the two vector element registers and one or more corresponding bits from the vector carry register to the functional unit as inputs, and to successively store results from the functional unit as elements into a vector element register.

In one such embodiment, the controller is adapted to transmit successive elements from any selected pair of the vector element registers and successive corresponding bits from the vector carry register as operands to the functional unit and to transmit results from the functional unit to successive elements of any selected one of the vector element registers and to successive corresponding bits of the vector carry register.

In another such embodiment, the functional unit is adapted to successively add pairs of elements of the vector element registers along with a corresponding carry-in bit from the vector carry register as operands to the functional unit and to successively output sum and carry-out results from the functional unit.

In yet another such embodiment, the functional unit is adapted to successively subtract an element of one vector element register and a corresponding borrow-in bit from the vector carry register from an element of another vector element register as operands to the functional unit and to successively output difference and borrow-out results from the functional unit.

In some embodiments, the controller is adapted to transmit two or more successive elements from each one of any selected pair of the vector element registers and two or more successive corresponding bits from the vector carry register as operands to the functional unit and to transmit two or more results from the functional unit to successive elements of any selected one of the vector element registers and to successive corresponding bits of the vector carry register.

In other embodiments, the controller is adapted to transmit four or more successive elements from each one of any selected pair of the vector element registers and four or more successive corresponding bits from the vector carry register as operands to the functional unit and to transmit four or more results from the functional unit to successive elements of any selected one of the vector element registers and to successive corresponding bits of the vector carry register.

Other aspects of the present invention provide a method for performing the above-described extended-precision arithmetic.

Yet other aspects of the present invention provide a vector processor for performing the above-described extended-precision arithmetic.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
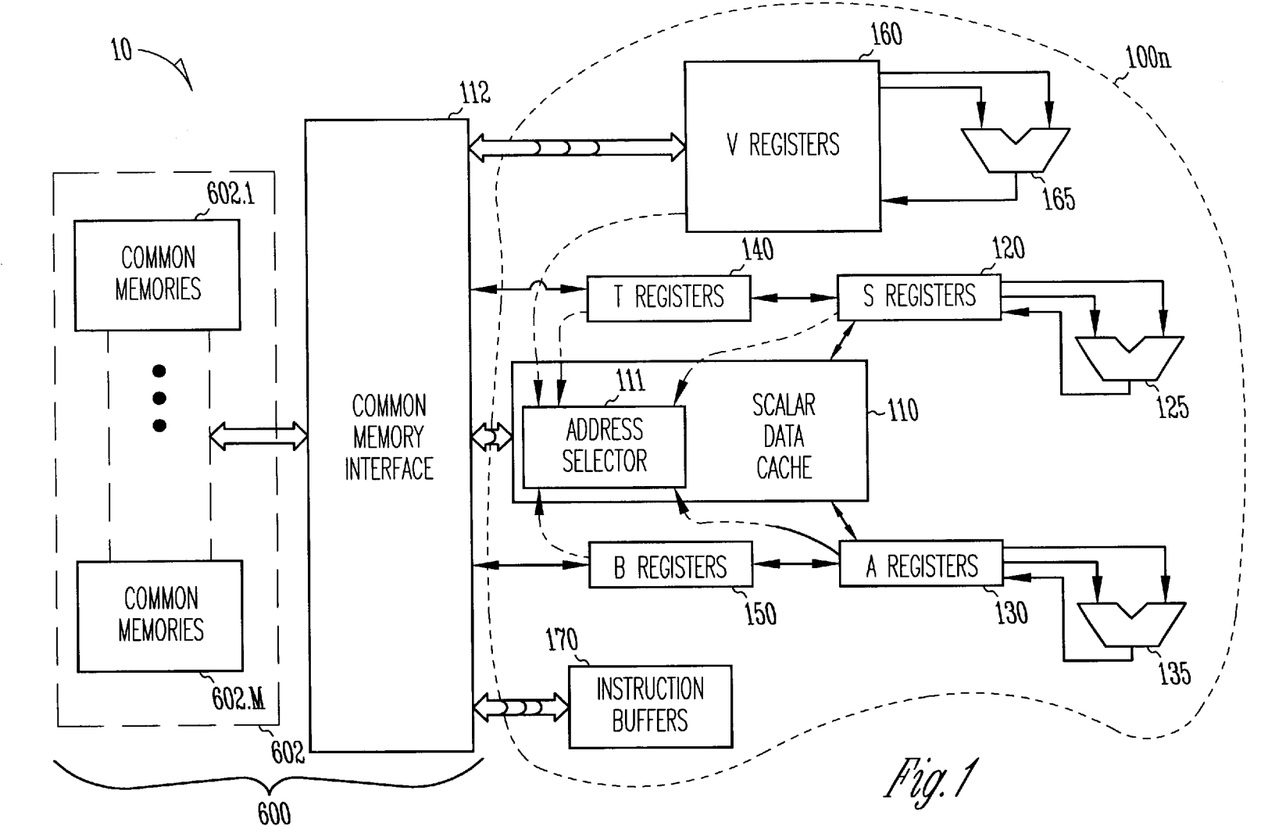
FIG. 1 shows a simplified schematic of one embodiment of the present invention, multiprocessor system 10 having a main memory 600 and a vector processor 100n.

FIG. 1 shows a simplified view of one embodiment of the present invention, multiprocessor system 10 having a main memory 602 and one or more vector processors 100. In one embodiment, a typical multiprocessor system 10 will include up to sixteen or more vector processors 100, of which only one (vector processor 100n) is shown. In the embodiment shown, each vector processor 100 includes a plurality of vector element registers 160 (one embodiment includes eight vector element registers 160, each of which includes 128 elements, numbered 0 through 127, each element holding 64 bits), and a vector carry register 169 (see FIG. 2A; one embodiment includes one vector carry register 169 which includes 128 locations, numbered 0 through 127, each location holding 1 bit, that bit is used to indicate the presence or absence of a carry or a borrow or other function). Any of the vector element registers 160, as well as the vector carry register 169 can be selected as inputs (i.e., as providing operands) or outputs (i.e., providing a destination for results) to vector arithmetic or logical functional unit 165.

Figure 2A:
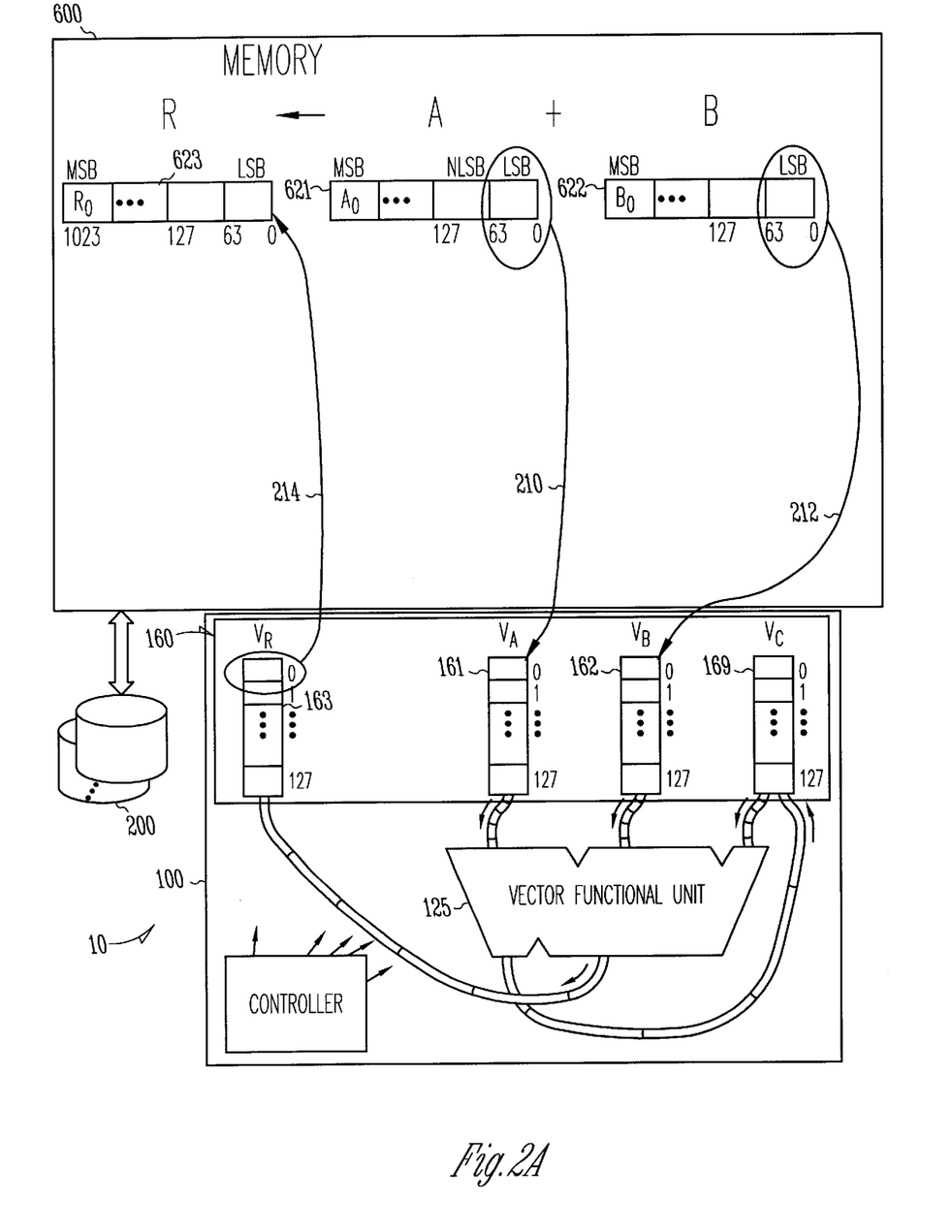
FIG. 2A shows the first step of a single number (non-vector or single-element vector) extended-precision arithmetic.
Figure 2B:
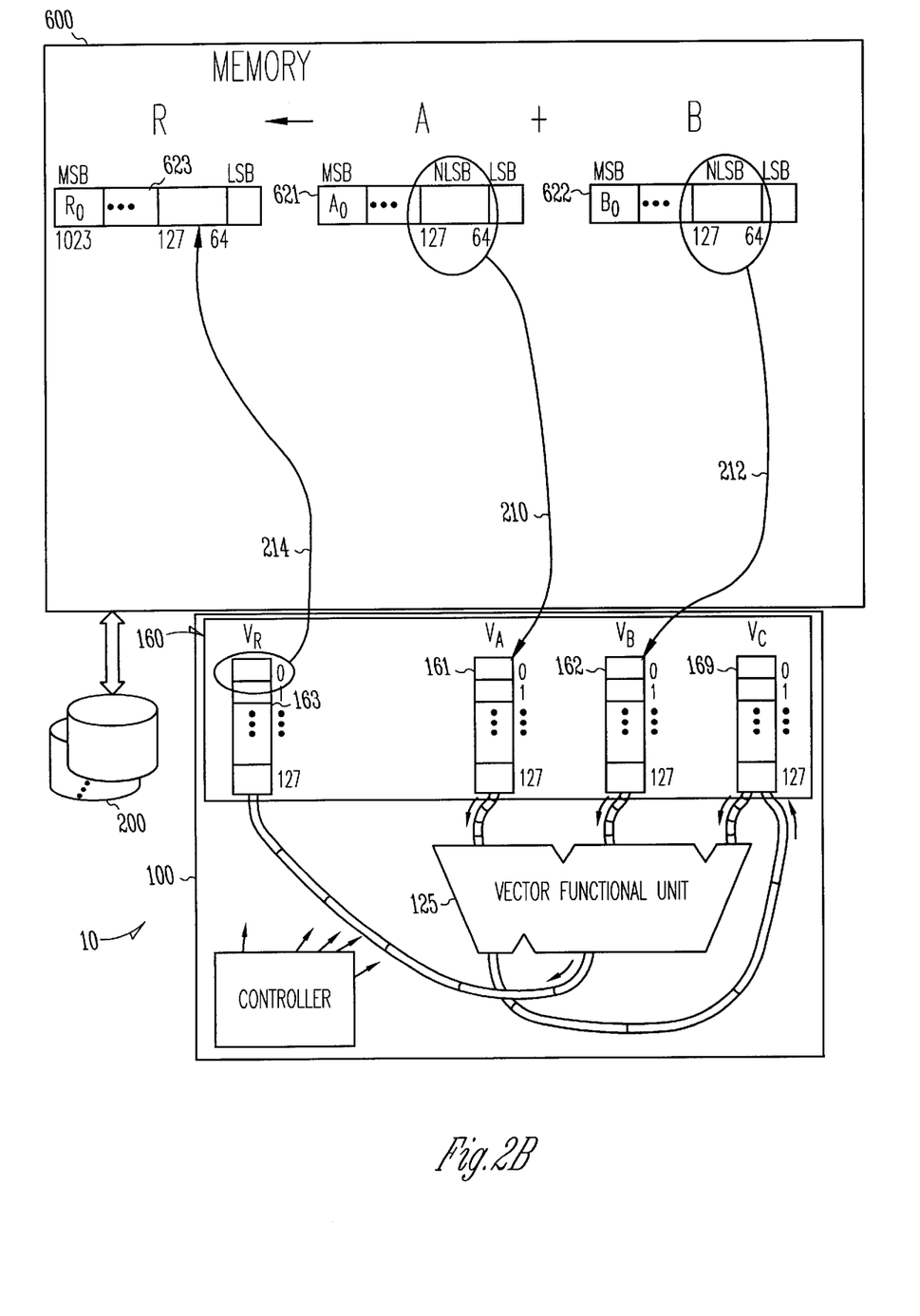
FIG. 2B shows the next step of single number extended-precision arithmetic.

In the example shown in FIGS. 2A and 2B, extended-length arithmetic is to be performed on long integers (i.e., non-vectors, or single-element vectors) normally held in main memory 600. FIG. 2A shows the first step of a single number (non-vector) extended-precision arithmetic. Operands A and B, each having a number of significant bits that exceeds the word length of the arithmetic processor 100, e.g., operands each being 1024 bits long (for example), are to be added together (for example), and the result R, which can be 1025 bits long is stored in R. In one embodiment, A, B and R are each considered single-element vectors. Each vector has 1 element which, for example has 1024 bits) and operated on to and from the vector registers (in one embodiment, each vector register holds 128 elements each having 64 bits, but only element 0 is used) in the processor 100. The vectors A, B, and R in memory are denoted as $A_0$ 621, $B_0$ 622, and $R_0$ 623, respectively.

The vector carry register ($V_C$ register) 169 is initialized by zeroing the location-0 bit, for example, by zeroing all bits of $V_C$ register 169. Operands A and B are each loaded into vector processor 100n in a repeated sequence of: a single 64-bit load operation for each operand (i.e., load operation 210 loads the 64 LSBs of A into the 0th element of vector register $V_A$ 161, and load operation 212 loads the 64 LSBs of B into the 0th element of vector register $V_B$ 162), the pair of operands operated on in functional unit 125 (e.g., an addition operation), and store operations of the results (e.g., store operation 214 stores the 64 LSBs of the 0th element of vector register $V_R$ 163 into R. I.e., the initial carry-in (for the $2^0$ bit position) of location 0 of $V_C$ register 169 is zeroed, the least-significant-bit-position (LSB) 64 bits of operand A 621 (the $2^0$–$2^{63}$ bit positions) are loaded into element 0 of $V_A$ 161, the LSB 64 bits of operand B 622 (the $2^0$–$2^{63}$ bit positions) are loaded into element 0 of $V_B$ 162, element 0 of $V_A$ 161 and element 0 of $V_B$ 162 are added together with the zero carry-in from location 0 of $V_C$ register 169 (at the $2^0$ bit position), the sum is placed in element 0 of $V_R$ 163 and the carry-out (the $2^{64}$ bit position) is placed in location 0 of $V_C$ register 169, element 0 of $V_R$ 163 is then stored to the LSB position of result R 623. (See FIG. 2A).

It should be realized that, in one embodiment, vector processor 100 has a set of vector registers 160, any one of which can be used to hold operands or results.

Thus, in this embodiment, $V_R$ is specified as Vi, $V_A$ is specified as Vj, and $V_B$ is specified as Vk, and arithmetic is specified as Vi=Vj+Vk. In other embodiments, any desired mapping of operands or results to particular vector registers is used.

FIG. 2B show the next step of single number extended-precision arithmetic. Location 0 of $V_C$ register 169 is now set up to propagate the carry (the $2^{64}$ bit position) to the next operation, the next-least-significant-bit-position (NLSB) 64 bits of operand A 621 (the $2^{64}$–$2^{127}$ bit positions of the extended-length operand number) are loaded into element 0 of $V_A$ 161 (the $2^0$–$2^{63}$ bit positions of the register), the NLSB 64 bits of operand B 622 (the $2^{64}14$ $2^{127}$ bit positions of the extended-length operand number) are loaded into element 0 of $V_B$ 162 (the $2^0$–$2^{63}$ bit positions of the register), element 0 of $V_A$ 161 and element 0 of $V_B$ 162 are added together with the propagated carry-in from location 0 of $V_C$ register 169, the sum is placed in element 0 of $V_R$ 163 and the carry-out (the $2^{128}$ bit position of the extended-length number) is placed in location 0 of $V_C$ register 169, element 0 of $V_R$ 163 is then stored to the NLSB position of result R 623 (the $2^{64}$–$2^{127}$ bit positions of the extended-length result number). This process is repeated for a total of sixteen 64-bit operations in order to add all 1024 bits of the source operands, and after the last operation, the location 0 of $V_C$ register 169 (i.e., the final carry-out bit (the 1025th bit position of the extended-length result number)) is then stored to the 1025 th bit of the result R 623 (labeled C). It will be realized that this process can be extended to almost any length operands, for example two one-million-bit operands can be added together by approximately 16,000 such 64-bit operations.

In a similar manner, extended-length subtraction can be performed. Two's complement arithmetic is accomplished by performing a one's complement of the subtrahend (i.e., bit-wise inverting every bit of the subtrahend B, equivalent to a bit-by-bit logical B-NOT, or $\overline{B}$), and adding 1 (i.e., a carry-in) to the low-order bit (the $2^0$ bit position of the extended-length number) while adding to the minuend, i.e., (A−B)=(A+$\overline{B}$+1). Likewise, a borrow is indicated by lack of carry-in, i.e., (A−B−1)=(A+$\overline{B}$+0). Thus, for a subtraction, the locations of $V_C$ register 169 are used to indicate borrows, wherein a one indicates no borrow, and a zero indicates a borrow of one. Therefore, a single extended-length subtraction is accomplished by setting the initial carry-in of location 0 of $V_C$ register 169 to one, and the least-significant-bit-position (LSB) 64 bits of operand A 621 are loaded into element 0 of $V_A$ 161, the LSB 64 bits of operand B 622 are loaded into element 0 of $V_B$ 162, element 0 of $V_A$ 161 and element 0 of $V_B$ 162 are added together (after inverting every bit of the B operand) with the one carry-in (i.e., zero borrow-in) from location 0 of $V_C$ register 169, the result (i.e., the difference $A_{LSB}$−$B_{LSB}$) is placed in element 0 of $V_R$ 163 and the borrow-out is placed in location 0 of $V_C$ register 169, element 0 of $V_R$ 163 is then stored to the LSB position of result R 623. (See FIG. 3B.) The bit at location 0 of $V_C$ register 169 is now set up to propagate the borrow to the next operation (wherein a zero indicates borrow-in and one indicates no borrow-in), and the next-least-significant-bit-position (NLSB) 64 bits of operand A 621 are loaded into element 0 of $V_A$ 161, the NLSB 64 bits of operand B 622 are loaded into element 0 of $V_B$ 162, element 0 of $V_A$ 161 and element 0 of $V_B$ 162 are added together (again, after inverting every bit of the B operand) with the propagated borrow-in from location 0 of $V_C$ register 169, with from location 0 of $V_C$ register 169, the result (i.e., the difference $A_{NLSB}$−$B_{NLSB}$ with the propagated borrow bit) is placed in element 0 of $V_R$ 163 and the borrow-out is placed in location 0 of $V_C$ register 169, element 0 of $V_R$ 163 is then stored to the NLSB position of result R 623. This process is repeated for a total of sixteen 64-bit operations in order to subtract all 1024 bits of the source operands, and after the last operation, the location 0 of $V_C$ register 169 (i.e., the final borrow-out bit) can be then stored to the 1025th bit of the result R 623 (labeled C), or analyzed to determine overflow or other properties of the result. It will be realized that this subtraction process can be extended to almost any length operands, for example two one-million-bit operands can be subtracted, one from the other, by approximately 16,000 such 64-bit operations.

In the above two examples, the carry or borrow bit is held inside the vector processor 100n (in location 0 of $V_C$ register 169), and reused (or propagated) across the necessary number of operations or bits without having to be stored to memory and reloaded. The programmer (or operating system) also has the option of interrupting the series of extended-length operations by performing such a store operation on the carry bit, and then later reloading $V_C$ register 169 with the saved carry bit to resume the addition or subtraction. For example, a task swap would need to save the carry bits from a task being swapped out, and then later, when the task is swapped back in, reload the carry bits to the state that was saved.

In another embodiment, the borrow bits (used for a subtract operation) in $V_C$ register 169 are stored as a 0 bit for no borrow, and a 1 bit for a borrow (i.e., inverted from the description above). Such borrow bits are inverted going to the vector functional unit 165, operated on as described above, then inverted going back into $V_C$ register 169. When $V_C$ register 169 is initialized for an extended precision subtract in such an embodiment, $V_C$ register 169 is zeroed (rather than set to all ones, as above), thus making initialization of $V_C$ register 169 for subtract operations the same as in the addition operations.

The above example provides a simple case of adding (or subtracting) a single pair of numbers, each having an extended-length number of bits. To take better advantage of the vector-processing capabilities of vector processor 100n, each of up to 128 (or more) extended-length numbers can be added to or subtracted from another corresponding number of extended-length numbers.

Figure 3A:
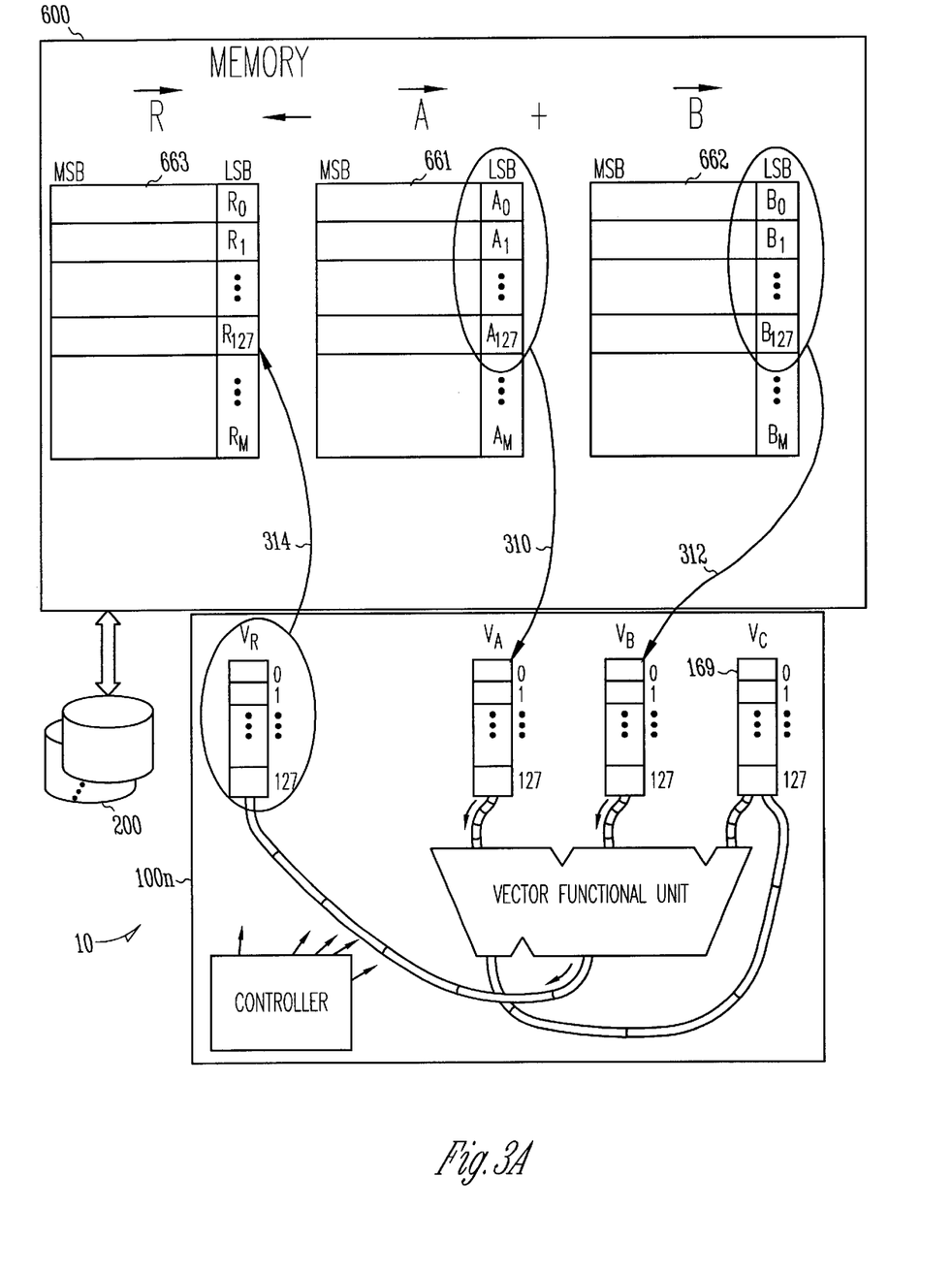
FIG. 3A shows the first step of a vector extended-precision arithmetic.
Figure 3B:
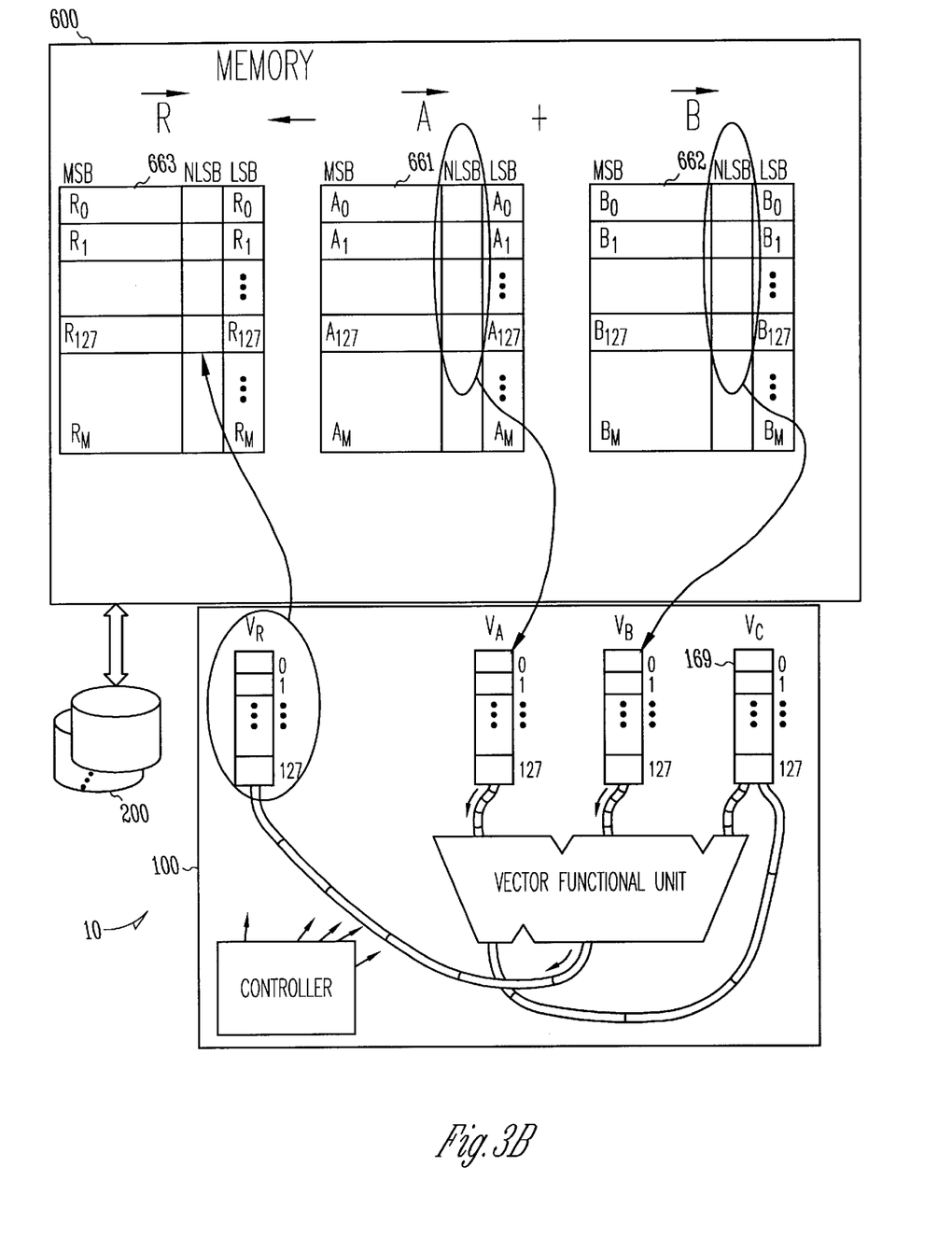
FIG. 3B shows the next step of the vector extended-precision arithmetic.

FIGS. 3A and 3B (together, FIG. 3) expand on the examples given above. 128 operands $\vec{A}$, each 1024 bits long (for example), are to be added to 128 operands $\vec{B}$, each 1024 bits long, and the 128 results $\vec{R}$, which each can be 1025 bits long is stored in result $\vec{R}$. The vector carry register ($V_C$ register) 169 is initialized by zeroing all 128 bits of $V_C$ register 169.

In the example shown in FIG. 3, extended-length arithmetic is to be performed on vectors of long integers normally held in main memory 600. Operands A and B, each having a number of significant bits that exceeds the word length of the arithmetic processor 100, e.g., operands each being 1024 bits long (for example), are to be added together (for example), and the result R, which can be 1025 bits long is stored in R. In one embodiment, A, B and R are each vectors, representing ordered sets of numbers. Each vector has M elements, where M may exceed the number of elements in the vector registers (in one embodiment, each vector register holds 128 elements each having 64 bits) in the processor 100. The vectors A, B, and R in memory are denoted as $A_0$ to $A_M$, $B_0$ to $B_M$, and $R_0$ to $R_M$, respectively.

In one embodiment, the vectors A, B, and R are stored in memory by mapping (reordering) the bits to an order that facilitates fast loading and storing to and from the vector registers. For example, the 64 least-significant bits (LSBs) of element $A_0$ are held adjacent to the 64 LSBs of element $A_1$, which are held adjacent to the 64 LSBs of element $A_2$, and so on until the 64 LSBs of element $A_M$. Similarly, the 64 LSBs of element $B_0$ are held adjacent to the 64 LSBs of element $B_1$, which are held adjacent to the 64 LSBs of element $B_2$, and so on until the 64 LSBs of element $B_M$; and the 64 LSBs of element $R_0$ are held adjacent to the 64 LSBs of element $R_1$, which are held adjacent to the 64 LSBs of element $R_2$, and so on until the 64 LSBs of element $R_M$. Then, the 64 next-least-significant bits (NLSBs) of element $A_0$ are held adjacent to the 64 NLSBs of element $A_1$, which are held adjacent to the 64 NLSBs of element $A_2$, and so on until the 64 NLSBs of element $A_M$. Similarly for the 64 NLSBs of each element of B and R.

In this way, (see FIG. 3A) the same order bits of each operands elements are fetched using a single vector load operation into a vector operand register (e.g., the 64 LSBs of each of 128 consecutive elements of A are fetched using one vector load operation 310 into $V_A$, and the 64 LSBs of each of 128 consecutive elements of B are fetched using one vector load operation 312 into $V_B$).

Operands $\vec{A}$ and $\vec{B}$ are each loaded into vector processor 100n in a sequence of: up to one-hundred-twenty-eight 64-bit load operations for each operand, operated on, and store operations of the results. I.e., the initial carry-in bits of locations 0 to 127 of $V_C$ register 169 are zeroed, the least-significant-bit-position (LSB) 64 bits of each of the 128 operands $\vec{A}$ 661 are loaded (load operation 310) into $V_A$ 161, the LSB 64 bits of each of the 128 operands $\vec{B}$ 662 are loaded (load operation 312) into element 0 of $V_B$ 162, and a single vector command adds each element, starting with element 0, of $V_A$ 161 and each corresponding element, starting with element 0, of $V_B$ 162 together with the zero carry-in from each corresponding location, starting with location 0, of $V_C$ register 169, the 128 sums are placed in the 128 corresponding elements, starting with element 0, of $\vec{V_R}$ 163 and the 128 carry-outs are placed in the 128 corresponding locations, starting with location 0 of $V_C$ register 169, and all 128 elements of $\vec{V_R}$ 163 are then stored (store operation 314) to the LSB positions of result $\vec{R}$ 663. In one embodiment, the vector add operation is performed as a serial pipelined operation, in which one pair of elements is operated on in each successive clock cycle, and results are output serially, one result per clock cycle. Thus an earlier operation need not complete before the next operation commenses, and indeed, a pipeline can be 10 to 20 or more stages deep (i.e., 10 to 20 elements are fed into the pipeline before the first result is loaded into the result vector register).

Figure 4:
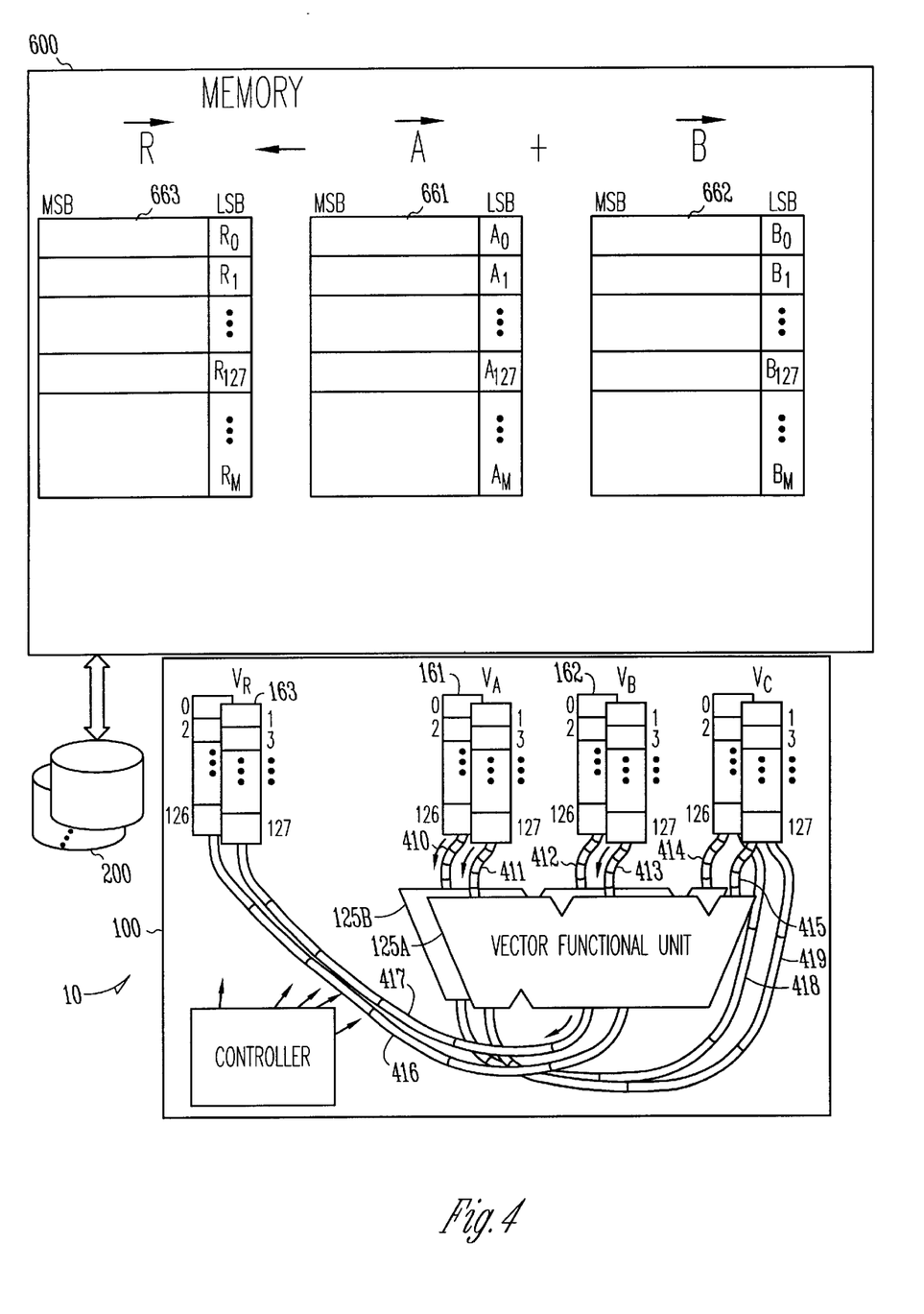
FIG. 4 shows a two-pipe parallel pipeline vector extended-precision arithmetic processor.

In another embodiment, shown in FIG. 4 (which shows a two-pipe parallel pipeline vector extended-precision arithmetic processor), a plurality of elements are read from each operand register each clock cycle and fed into parallel pipelines (e.g., two pipelines as shown in FIG. 4, or four pipelines, or other number of parallel pipelines, based on the cost/performance needs of the designer) in order that results can be generated faster than the read/write cycle time of the vector registers. In the embodiment shown, the even-numbered vector register elements are fed into one pipeline (410, 412 and 414 for even elements from $V_A$, $V_B$ and $V_C$ respectively), and the odd-numbered elements into a second pipeline (411, 413 and 415 for odd elements from $V_A$, $V_B$ and $V_C$ respectively) for each operand (elements and carries) and each result (pipeline 416 for even result elements, pipeline 417 for odd result elements, pipeline 418 for even result carries and pipeline 419 for odd result carries), and parallel vector functional units 125A and 125B produce two results on each successive clock. For further details on vector pipeline operations, see U.S. Pat. No. 4,128,880 to Seymour Cray et al., which is hereby incorporated by reference.

Figure 5:
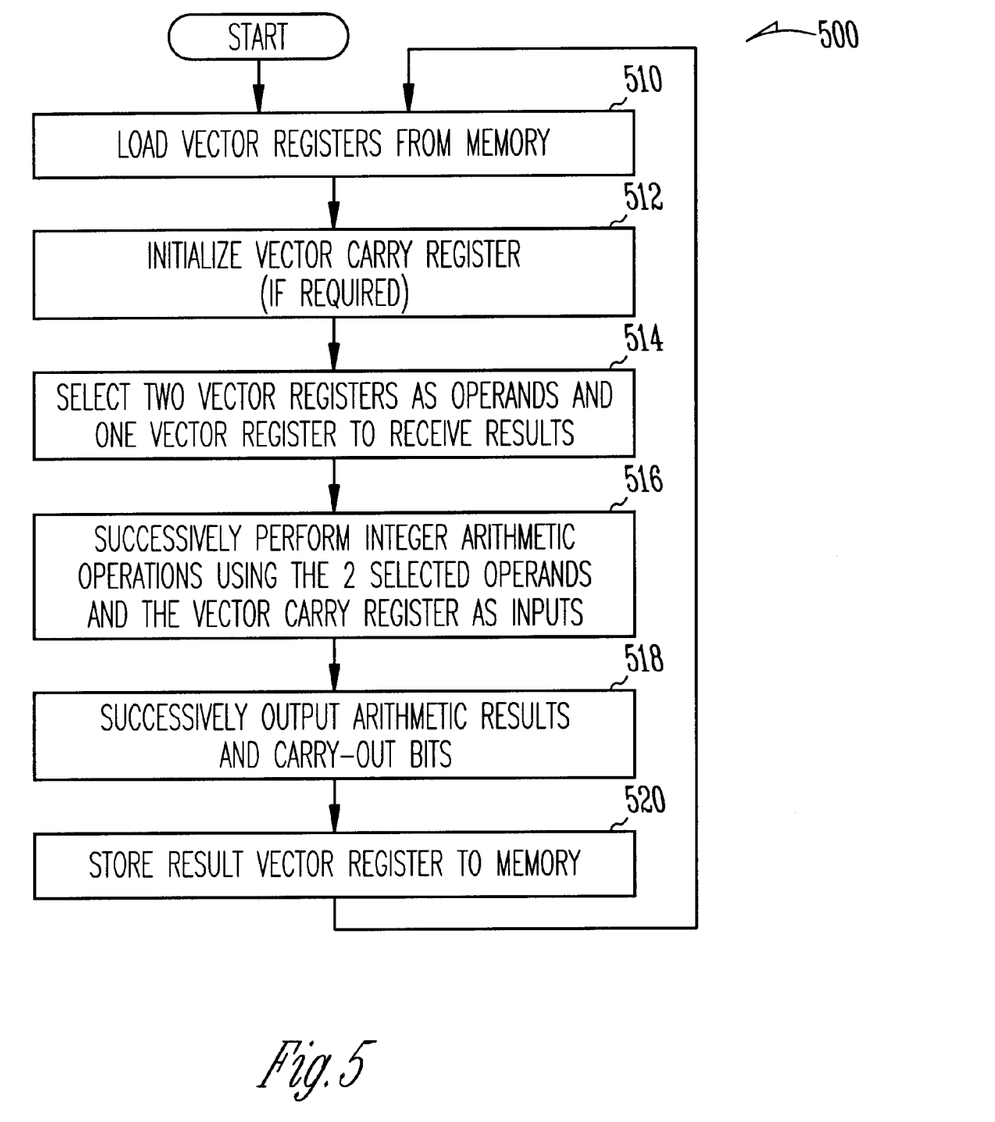
FIG. 5 shows a process according to the present invention having vector extended-precision arithmetic processor.

FIG. 5 shows a process according to the present invention having vector extended-precision arithmetic processor. At block 510, the vector registers (e.g., $V_A$ 161 and $V_B$ 162) are loaded from memory 600. At block 512, the $V_C$ register 169 is initialized (e.g., in the first pass, it is zeroed for addition operations, or set to all ones for subtraction operations). At block 514, a vector extended-precision instruction is decoded, and the operand and result vector registers are selected to connect to the respective pipelines. At block 516, the vector functional unit performs successive arithmetic operations on the pipelined operands and carry bits. At block 518, the arithmetic results and respective carry bits are output into the result vector register. At block 520, the result vector register 163 is stored into memory. Control then loops back to block 510. In one embodiment, the operations in the respective blocks are overlapped with operations of other blocks. For example, the vector arithmetic operations (block 514–518) can start with the first several elements before all of the last elements have been obtained from memory (block 510). Further, the store operation of block 520 for the first elements can start before all the result elements have been computed. In one embodiment, the order shown by the blocks and arrows of FIG. 5 is used. However, in some other embodiments, other orders of operations are used.

As noted above, in one embodiment, vector processor 100 has a set of vector registers 160, any one of which can be used to hold operands or results. Thus, in this embodiment, $V_R$ is specified as Vi, $V_A$ is specified as Vj, and $V_B$ is specified as Vk, and arithmetic is specified as Vi=Vj+Vk.

The 128 locations of $V_C$ register 169 are now set up to propagate the carry its to the next vector operation, the 128 next-least-significant-bit-position (NLSB) 64 bits of operand $\vec{A}$ 661 are loaded into elements 0–127 of Vj 161, the 128 NLSB 64 bits of operand $\vec{B}$ 662 are loaded into elements 0–127 of Vk 162, with a single vector command Vj 161 and Vk 162 are added together with the propagated carry-ins from $V_C$ register 169, the sums are placed in elements 0–127 of Vi 163 and the carry-outs are placed in location 0–127 of $V_C$ register 169, the 128 elements of Vi 163 are then stored to the NLSB positions of result $\vec{R}$ 663. This process is repeated for a total of sixteen 128-by-64-bit operations in order to add all 1024 bits of the 128 pairs of source operands, and after the last operation, the locations 0–127 of $V_C$ register 169 (i.e., the final 128 carry-out bits) are then stored to the 1025th bit of the result $\vec{R}$ 663 (labeled C). It will be realized that this process can be extended to almost any length operands, for example 128 pairs of one-million-bit operands can be added together by approximately 16,000 such 128-by-64-bit vector operations.

Vector subtractions are performed in order to subtract multiple pairs one from the other, in like manner by extending the single-element subtraction operation described above to vector operations having up to 128 element operations, each with carry/borrow. The $V_C$ register 169 is initialized to all ones (i.e., 128 one bits, one per location).

One embodiment of the present invention includes instructions for vector/vector integer add with carry (Vi, c←Vj+Vk, c); where the instruction specifies i, j, and k); scalar/vector integer add with carry (Vi, c←Sj+Vk, c); vector/vector integer subtract with carry (Vi, c←Vj−Vk, c); and scalar/vector integer subtract with carry (Vi, c←Sj−Vk, c). One such embodiment uses the vector mask register to hold the carry bits, i.e., this embodiment merges the vector mask register and $V_C$ register 169. In this embodiment for the vector/vector integer add, the $n^{th}$ elements of the source registers and the $n^{th}$ location of the vector mask register are added: $Vi_n$, $M_n$←$Vj_n$+$Vk_n$+$M_n$. For the scalar/vector integer add: $Vi_n$, $M_n$←$Sj$+$Vk_n$+$M_n$. For the vector/vector integer subtract, the bits of source operand k are inverted, and $n^{th}$ elements of the source registers and the $n^{th}$ location of the vector mask register are added: $Vi_n$, $M_n$←$Vj_n$+NOT($Vk_n$)+$M_n$. For the scalar/vector integer subtract: $Vi_n$, $M_n$←$Sj$+NOT($Vk_n$)+$M_n$. In one such embodiment, the carry/borrow bits are initialized by an instruction that loads the vector mask register from memory, and the carry/borrow bits are saved by an instruction that stores the vector mask register to memory. In one such embodiment, a task swap operation causes the current contents of the vector mask register to be saved into a task object in memory, and the vector mask register contents to be replaced with the proper corresponding information from the task object being swapped in.

In order to add more than 128 extended-length pairs of numbers, multiple series of vector operations are performed, i.e., the first 128 pairs are added (each from the LSB to the MSB (least-significant bits to the most-significant bits)), then the next 128 pairs of numbers are added (each from the LSB to the MSB), and so on until all the required numbers are added.

In one embodiment, extended-length vector operands, e.g., for the vector addition and subtraction operations described above, are stored in memory grouped for efficient loading and storing of bits to and from the vector registers. In one such embodiment, the LSB 64-bits of each of the 128 numbers to be transferred to one vector register are held in 128 successive consecutive 64-bit locations in memory, and the NLSB 64-bits of each of the 128 numbers to be transferred to that vector register are held in the next 128 successive consecutive 64-bit locations in memory, and so on. This organization allows the memory system to use page-mode accesses or other fast-mode sequential access methods to efficiently load and store operands, wherein each vector load and each vector store operations loads (or stores) vector elements from consecutive locations in memory.

Alternatively, the numbers can be held in memory in bit-order for every number, (i.e., each number having the entire number from LSB to MSB stored in consecutive locations in memory, followed by the entire next number, etc.) and the fetch mechanism of processor 100*n* can stride through memory while loading vectors, i.e., load the LSB 64 bits of the first number into element 0 of Vj, skip the rest of the first number, load the LSB 64 bits of the second number into element 1 of Vj, skip the rest of the second number, load the LSB 64 bits of the third number into element 2 of Vj, etc. For example, if each extended-length number (ELN) is 1024 bits wide, and each vector element is 64 bits wide, the corresponding bits of each ELN held in bit-order can be fetched by using a stride of 16 * 64 bits, i.e., loading 64 bits (the LSB of the first number going to element 0 of a vector register), skipping 960 bits in memory, loading 64 bits (the LSB of the second number going to element 1 of the vector register), skipping 960 bits in memory, loading 64 bits, etc. However, for extended-length numbers having very long lengths, the stride becomes very large, and efficient sequential memory access methods cannot be easily used.

In one embodiment, extended-length logical operations are provided using the $V_C$ register 169 to accumulate condition codes (e.g., a cumulative zero (CZ) bit is initialized to one, and used as an input, if the input CZ bit is one and the logical operation produces zero results, the bit is output as one, else it is zeroed; If the bit is zero upon input, it is left as zero, regardless of the results of the logical operation). This produces extended-length logical operations.

In one embodiment, extended-length shift operations are provided using the $V_C$ register 169 to hold shift-out bits from one operation for use as shift-in bits for successive operations on corresponding elements. In one such embodiment, each location of $V_C$ register 169 hold a plurality of shift-in bits (as inputs) or shift-out bits (as outputs). This produces extended-length shift operations. In another such embodiment, another vector register (i.e., any one of the vector registers 160) wherein each element of the vector register holds a plurality of shift-in bits (as inputs) or shift-out bits (as outputs).

In one embodiment, extended-length multiplication is supported by extended-precision multiply operations that generate multiple extended-length partial results, which are then combined by successively adding multiple pairs of the extended-length partial results until all are summed to a final result. For example, in a first extended-length vector add operation, the first and second partial results are added to one another, the third and fourth partial results are added to one another, the fifth and sixth partial results are added to one another, the seventh and eighth partial results are added to one another, etc. Then, in a second extended-length vector add operation, the sum, from the first operation, of the first and second partial results are added to sum of the third and fourth partial results from the first operation, the sum of the fifth and sixth partial results, from the first operation, are added to the sum of the seventh and eighth partial results from the first operation, etc. Subsequent extended-length vector add operations further consolidate the partial-sum results until a single final sum is achieved, representing the product of the extended-length multiplication. In one such embodiment, an extended-length integer vector multiply instruction is performed in two passes; one pass to generate the lower results, and another pass to generate the upper results, and then an extended precision addition operation controls the operation to generate a product from the partial results. (E.g., in one embodiment, a 64-bit multiplier times a 64-bit multiplicand generates a 128-bit product, and to extend such an operation to N * 64-bit multiplicands, the multiplication is done in two passes, one pass generates the lower 64 bits of each 128-bit partial product, a second pass generates the upper 64 bits of each 128-bit partial product, each as an N-element vector. These N-element vectors are then added to one another with the proper alignment to generate the final result of the 64-bit multiplier times the N * 64-bit multiplicand. For longer multipliers, this process is repeated as many times as needed, and the partial results for each 64-bits of multiplier are accumulated.)

The extended-length arithmetic and logical operations of the present invention are used advantageously in a number of applications such as extended-precision precision mathematics (e.g., calculating pi to a large number of digits), navigation, and cryptography.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A vector computer comprising:

a memory;

an input-output subsystem including magnetic disk drives;

a plurality of vector element registers, each vector element register coupled to the memory and operable to be selectively loaded with data from the memory, each vector element register including a plurality of N elements, and each element having a plurality of bits;

a vector carry register, the vector carry register including a plurality of N bits; and a vector arithmetic or logical functional unit having an input coupled to receive data operands from the respective elements of two of the plurality of vector element register and the vector carry register, and operable to produce a result as an output, wherein each element of the result is based on an element from the first vector element register, a corresponding element from the second vector element register, and a corresponding bit from the vector carry register; and a controller associated with the vector registers and responsive to program instructions to successively transmit one or more corresponding elements from each of the two vector element registers and one or more corresponding bits from the vector carry register to the functional unit and to successively store results from the output of the functional unit as elements into one of the plurality of vector element registers.

2. The vector computer according to claim 1 wherein the controller is adapted to transmit successive elements from any selected pair of the vector element registers and successive corresponding bits from the vector carry register as operands to the functional unit and to transmit results from the functional unit to successive elements of any selected one of the vector element registers and to successive corresponding bits of the vector carry register.

3. The vector computer according to claim 1 wherein the functional unit is adapted to successively add pairs of elements of the vector element registers along with a corresponding carry-in bit from the vector carry register as operands to the functional unit and to successively output sum and carry-out results from the functional unit.

4. The vector computer according to claim 1 wherein the functional unit is adapted to successively subtract an element of one vector element register and a corresponding borrow-in bit from the vector carry register from an element of another vector element register as operands to the functional unit and to successively output difference and borrow-out results from the functional unit.

5. The vector computer according to claim 1 wherein the controller is adapted to transmit two or more successive elements from each one of any selected pair of the vector element registers and two or more successive corresponding bits from the vector carry register as operands to the functional unit and to transmit two or more results from the functional unit to successive elements of any selected one of the vector element registers and to successive corresponding bits of the vector carry register.

6. The vector computer according to claim 1, wherein the controller is adapted to transmit four or more successive elements from each one of any selected pair of the vector element registers and four or more successive corresponding bits from the vector carry register as operands to the functional unit and to transmit four or more results from the functional unit to successive elements of any selected one of the vector element registers and to successive corresponding bits of the vector carry register.

7. The vector computer according to claim 1 wherein each element of the vector element registers has more bits than each corresponding element of the vector carry register.

8. The vector computer according to claim 1 wherein each element of the vector element registers has a plurality of M bits, and each corresponding element of the vector carry register has one bit.

9. The vector computer according to claim 1 wherein the controller is adapted, within a single clock cycle, to transmit two or more successive elements from each one of any selected pair of the vector element registers and two or more successive corresponding bits from the vector carry register as operands to the functional unit and to transmit two or more results from the functional unit to successive elements of any selected one of the vector element registers and to successive corresponding bits of the vector carry register.

10. The vector computer according to claim 1, wherein the controller is adapted, within a single clock cycle, to transmit four or more successive elements from each one of any selected pair of the vector element registers and four or more successive corresponding bits from the vector carry register as operands to the functional unit and to transmit four or more results from the functional unit to successive elements of any selected one of the vector element registers and to successive corresponding bits of the vector carry register.

11. A vector computer comprising:

a memory;

an input-output subsystem including magnetic disk drives;

a plurality of vector element registers, each vector element register coupled to the memory and operable to be selectively loaded with data from the memory, each vector element register including a plurality of N elements, and each element having a plurality of bits;

a vector carry register, the vector carry register including a plurality of N bits; and a vector arithmetic or logical functional unit having an input coupled to receive data operands from the respective elements of two of the plurality of vector element registers and the vector carry register, and operable to produce a result as an output, wherein each element of the result is based on an element from the first vector element register, a corresponding element from the second vector element register, and a corresponding bit from the vector carry register; and a controller associated with the vector registers and responsive to program instructions to successively transmit one or more corresponding elements from each of the two vector element registers and one or more corresponding bits from the vector carry register to the functional unit and to successively store results from the output of the functional unit as elements into one of the plurality of vector element registers, further comprising:

means for initializing the vector carry register with a plurality of N bits which are each zero;

means for loading low-order bits of each one of N extended-precision numbers of a first addend vector from the memory into successive elements of a first one of the plurality of vector element registers;

means for loading low-order bits of each one of N extended-precision numbers of a second addend vector from the memory into successive elements of a second one of the plurality of vector element registers;

means for storing low-order bits of each one of N extended-precision numbers of a resulting sum vector to the memory from successive elements of a third one of the plurality of vector element registers, wherein each one of N extended-precision numbers of the resulting sum vector is a sum of a corresponding bit of the vector carry register, a corresponding element of the first vector element register, and a corresponding element of the second vector element register;

means for loading next-higher-order bits of each one of N extended-precision numbers of a first addend vector from the memory into successive elements of the first one of the plurality of vector element registers;

means for loading next-higher-order bits of each one of N extended-precision numbers of a second addend vector from the memory into successive elements of the second one of the plurality of vector element registers; and means for storing next-higher-order bits of each one of N extended-precision numbers of a resulting sum vector to the memory from successive elements of the third one of the plurality of vector element registers, wherein each one of N extended-precision numbers of the resulting sum vector is a sum of a corresponding bit of the vector carry register, a corresponding element of the first vector element register, and a corresponding element of the second vector element register; and wherein the vector carry register is first loaded with carry-out bits of addition operations of the low-order bits, wherein said carry-out bits of the addition operations of the low-order bits are used as carry-in bits for addition operations of the next-higher-order bits, and wherein the vector carry register is next loaded with carry-out bits of addition operations of the next-higher-order bits.

12. A method of processing vectors in a computer having a main memory, a plurality of vector element registers, each vector element register holding a plurality of elements of an ordered set of data, a vector carry register holding a plurality of bits of an ordered set of data, and at least one pipelined arithmetic or logical functional unit for receiving successive inputs of operands while holding data for operations still being completed and for delivering successive operation results, the method comprising:
selectively transmitting data from the main computer memory to the vector registers for storage as a plurality of elements of an ordered set of data;
initializing the vector carry register with an ordered set of bits;
selecting from the plurality of vector registers at least one vector register as an operand vector register to provide operands, and one vector register to receive results;
successively inputting the elements of the ordered set of data from the selected operand vector register and bits of the vector carry register to the functional unit on successive clock periods; and
successively outputting results produced by the functional unit as elements of an ordered set to the selected result vector register and as bits of an ordered set of bits to the vector carry register on successive clock periods following delivery of a first result from the functional unit.

13. The method according to claim 12, wherein:
said successively inputting includes:
transmitting successive elements from any selected pair of the vector element registers, and
transmitting successive corresponding bits from the vector carry register as operands to the functional unit; and said outputting includes:
transmitting results from the functional unit to successive elements of any selected one of the vector element registers and to successive corresponding bits of the vector carry register.

14. The method according to claim 12, further comprising:
successively adding pairs of elements from the vector element registers with corresponding carry-in bits from the vector carry register as operands to the functional unit; and wherein said outputting successively outputs sum and carry-out results from the functional unit.

15. The method according to claim 12, further comprising:
successively subtracting pairs of elements from the vector element registers with corresponding borrow-in bits from the vector carry register as operands to the functional unit; and
wherein said outputting successively outputs difference and borrow-out results from the functional unit.

16. The method according to claim 12, wherein:
said inputting inputs two or more successive elements from each one of any selected pair of the vector element registers and two or more successive corresponding bits from the vector carry register as operands to the functional unit; and
said outputting outputs two or more results in parallel from the functional unit to successive elements of any selected one of the vector element registers and to successive corresponding bits of the vector carry register.

17. The method according to claim 12, wherein:
said inputting inputs four or more successive elements from each one of any selected pair of the vector element registers and four or more successive corresponding bits from the vector carry register as operands to the functional unit; and
said outputting outputs four or more results in parallel from the functional unit to successive elements of any selected one of the vector element registers and to successive corresponding bits of the vector carry register.

18. The method according to claim 12, wherein:
said successively inputting includes, during one clock period:
transmitting one element from each of any selected pair of the vector element registers and a corresponding bit from the vector carry register as operands to the functional unit.

19. The method according to claim 12, wherein:
said successively outputting includes, during one clock period:
transmitting a result from the functional unit to an element of any selected one of the vector element registers and to a corresponding bit of the vector carry register.

20. The method according to claim 12, wherein:
said successively inputting includes, during one clock period:
transmitting one element from each of any selected pair of the vector element registers and a corresponding bit from the vector carry register as operands to the functional unit; and
said successively outputting includes, during one clock period:
transmitting a result from the functional unit to an element of any selected one of the vector element registers and to a corresponding bit of the vector carry register.

21. The method according to claim 12, further comprising:
selectively storing result data from the selected result vector register to the main computer memory;
selectively transmitting further operand data from the main computer memory to the vector registers for storage as a plurality of elements of an ordered set of data;
keeping the ordered set of result bits in the vector carry register for use as operands;
successively inputting the elements of the further operand ordered set of data from the selected operand vector register and bits of the vector carry register to the functional unit on successive clock periods; and
successively outputting further results produced by the functional unit as elements of an ordered set to the selected result vector register and as bits of an ordered set of bits to the vector carry register on successive clock periods following delivery of a first result from the functional unit.

22. The method according to claim 12, wherein, within a single clock cycle:
said inputting inputs two or more successive elements from each one of any selected pair of the vector element registers and two or more successive corresponding bits from the vector carry register as operands to the functional unit; and said outputting outputs two or more results in parallel from the functional unit to successive elements of any selected one of the vector element registers and to successive corresponding bits of the vector carry register.

23. The method according to claim 12, wherein, within a single clock cycle:

said inputting inputs four or more successive elements from each one of any selected pair of the vector element registers and four or more successive corresponding bits from the vector carry register as operands to the functional unit; and said outputting outputs four or more results in parallel from the functional unit to successive elements of any selected one of the vector element registers and to successive corresponding bits of the vector carry register.

24. A method of processing vectors in a computer having a main memory, a plurality of vector element registers, each vector element register holding a plurality of elements of an ordered set of data, a vector carry register holding a plurality of bits of an ordered set of data, and at least one pipelined arithmetic or logical functional unit for receiving successive inputs of operands while holding data for operations still being completed and for delivering successive operation results, the method comprising:

selectively transmitting data from the main computer memory to the vector registers for storage as a plurality of elements of an ordered set of data;

initializing the vector carry register with an ordered set of bits;

selecting from the plurality of vector registers at least one vector register as an operand vector register to provide operands, and one vector register to receive results;

successively inputting the elements of the ordered set of data from the selected operand vector register and bits of the vector carry register to the functional unit on successive clock periods; and successively outputting results produced by the functional unit as elements of an ordered set to the selected result vector register and as bits of an ordered set of bits to the vector carry register on successive clock periods following delivery of a first result from the functional unit, further comprising:

initializing a plurality of carry-in bits in the vector carry register;

loading elements of a first vector element register with lowest-order bits of each of a first plurality of numbers from the main memory;

loading elements of a second vector element register with lowest-order bits of each of a second plurality of numbers from the main memory;

successively adding a pair of elements, one each from the first and second vector element registers, with a corresponding carry-in bit from the vector carry register as operands to the functional unit, and outputting successively sum and carry-out results from the functional unit to a third vector element register and the vector carry register respectively;

storing elements of the third vector element register to lowest-order bits of each of a third plurality of numbers in main memory;

loading elements of the first vector element register with next-lowest-order bits of each of the first plurality of numbers from the main memory;

loading elements of the second vector element register with next-lowest-order bits of each of the second plurality of numbers from the main memory;

successively adding a pair of elements, one each from the first and second vector element registers, with a corresponding carry-in bit from the vector carry register as operands to the functional unit and outputting successively sum and carry-out results from the functional unit to the third vector element register and the vector carry register respectively; and storing elements of the third vector element register to next-lowest-order bits of each of the third plurality of numbers in main memory.

25. A method of processing vectors in a computer having a main memory, a plurality of vector element registers, each vector element register holding a plurality of elements of an ordered set of data, a vector carry register holding a plurality of bits of an ordered set of data, and at least one pipelined arithmetic or logical functional unit for receiving successive inputs of operands while holding data for operations still being completed and for delivering successive operation results, the method comprising:

selectively transmitting data from the main computer memory to the vector registers for storage as a plurality of elements of an ordered set of data;

initializing the vector carry register with an ordered set of bits;

selecting from the plurality of vector registers at least one vector register as an operand vector register to provide operands, and one vector register to receive results;

successively inputting the elements of the ordered set of data from the selected operand vector register and bits of the vector carry register to the functional unit on successive clock periods; and successively outputting results produced by the functional unit as elements of an ordered set to the selected result vector register and as bits of an ordered set of bits to the vector carry register on successive clock periods following delivery of a first result from the functional unit, further comprising:

initializing a plurality of borrow-in bits in the vector carry register;

loading elements of a first vector element register with lowest-order bits of each of a first plurality of numbers from the main memory;

loading elements of a second vector element register with lowest-order bits of each of a second plurality of numbers from the main memory;

successively subtracting a pair of elements, one each from the first and second vector element registers, with a corresponding borrow-in bit from the vector carry register as operands to the functional unit, and outputting successively difference and borrow-out results from the functional unit to a third vector element register and the vector carry register respectively;

storing elements of the third vector element register to lowest-order bits of each of a third plurality of numbers in main memory;

loading elements of the first vector element register with next-lowest-order bits of each of the first plurality of numbers from the main memory;

loading elements of the second vector element register with next-lowest-order bits of each of the second plurality of numbers from the main memory;

successively subtracting a pair of elements, one each from the first and second vector element registers, with a corresponding borrow-in bit from the vector carry register as operands to the functional unit, and outputting successively difference and borrow-out results from the functional unit to a third vector element register and the vector carry register respectively; and storing elements of the third vector element register to next-lowest-order bits of each of the third plurality of numbers in main memory.

26. A vector processor comprising:

a plurality of vector element registers including a first and a second vector element register, each vector element register coupled to the memory and operable to be selectively loaded with data from a memory, each vector element register including a plurality of N elements, and each element having a plurality of bits;

a vector carry register, the vector carry register including a plurality of N bits; and a vector arithmetic functional unit having an input coupled to receive data operands from successive elements of two of the plurality of vector element registers and the vector carry register, and operable to produce a result, the result having successive elements and carry-out bits, wherein each element and carry-out bit of the result is based on an element from the first vector element register, a corresponding element from the second vector element register, and a corresponding carry-in bit from the vector carry register; and a controller associated with the vector registers and responsive to program instructions to successively transmit a corresponding element from each one of the two vector element registers and a corresponding bit from the vector carry register to the functional unit and to successively store results from the output of the functional unit as elements into one of the plurality of vector element registers and as bits into the vector carry register.

27. The vector processor according to claim 26, wherein the controller is adapted to transmit successive elements from any selected pair of the vector element registers and successive corresponding bits from the vector carry register as operands to the functional unit and to transmit results from the functional unit to successive elements of any selected one of the vector element registers and to successive corresponding bits of the vector carry register.

28. The vector processor according to claim 26, wherein the functional unit is adapted to successively add pairs of elements of the vector element registers along with a corresponding carry-in bit from the vector carry register as operands to the functional unit and to successively output sum and carry-out results from the functional unit.

29. The vector processor according to claim 26, wherein the functional unit is adapted to successively subtract an element of one vector element register and a corresponding borrow-in bit from the vector carry register from an element of another vector element register as operands to the functional unit and to successively output difference and borrow-out results from the functional unit.

30. A vector processor comprising:

a plurality of vector element registers including a first and a second vector element register, each vector element register coupled to the memory and operable to be selectively loaded with data from a memory, each vector element register including a plurality of N elements, and each element having a plurality of bits;

a vector carry register, the vector carry register including a plurality of N bits; and a vector arithmetic functional unit having an input coupled to receive data operands from successive elements of two of the plurality of vector element registers and the vector carry register, and operable to produce a result, the result having successive elements and carry-out bits, wherein each element and carry-out bit of the result is based on an element from the first vector element register, a corresponding element from the second vector element register, and a corresponding carry-in bit from the vector carry register; and a controller associated with the vector registers and responsive to program instructions to successively transmit a corresponding element from each one of the two vector element registers and a corresponding bit from the vector carry register to the functional unit and to successively store results from the output of the functional unit as elements into one of the plurality of vector element registers and as bits into the vector carry register, further comprising:

means for initializing the vector carry register with a plurality of N bits which are each zero;

means for loading low-order bits of each one of N extended-precision numbers of a first addend vector from the memory into successive elements of a first one of the plurality of vector element registers;

means for loading low-order bits of each one of N extended-precision numbers of a second addend vector from the memory into successive elements of a second one of the plurality of vector element registers;

means for storing low-order bits of each one of N extended-precision numbers of a resulting sum vector to the memory from successive elements of a third one of the plurality of vector element registers, wherein each one of N extended-precision numbers of the resulting sum vector is a sum of a corresponding bit of the vector carry register, a corresponding element of the first vector element register, and a corresponding element of the second vector element register;

means for loading next-higher-order bits of each one of N extended-precision numbers of a first addend vector from the memory into successive elements of the first one of the plurality of vector element registers;

means for loading next-higher-order bits of each one of N extended-precision numbers of a second addend vector from the memory into successive elements of the second one of the plurality of vector element registers; and means for storing next-higher-order bits of each one of N extended-precision numbers of a resulting sum vector to the memory from successive elements of the third one of the plurality of vector element registers, wherein each one of N extended-precision numbers of the resulting sum vector is a sum of a corresponding bit of the vector carry register, a corresponding element of the first vector element register, and a corresponding element of the second vector element register; and wherein the vector carry register is first loaded with carry-out bits of addition operations of the low-order bits, wherein said carry-out bits of the addition operations of the low-order bits are used as carry-in bits for addition operations of the next-higher-order bits, and wherein the vector carry register is next loaded with carry-out bits of addition operations of the next-higher-order bits.

31. A vector processor comprising:

a plurality of vector element registers including a first and a second vector element register, each vector element register coupled to the memory and operable to be selectively loaded with data from a memory, each vector element register including a plurality of N elements, and each element having a plurality of M bits; and a vector carry register, the vector carry register including a plurality of N elements, each of which has a single bit; wherein the vector processor is operable to obtain an M-bit element from one of the plurality of vector element registers and a one-bit operand from the vector carry register as operands for an operation.

32. The vector processor according to claim 31, further comprising:

a vector arithmetic functional unit having an input coupled to receive, at each one of a plurality of successive clock cycles, data operands from corresponding elements of two of the plurality of vector element registers and the vector carry register, and operable to produce a result at each of a later plurality of successive clock cycles, each such result having an M-bit result element and a one-bit carry-out element, wherein each M-bit result element and carry-out element of the result is based on an element from the first vector element register, a corresponding element from the second vector element register, and a corresponding carry-in bit from the vector carry register.

33. The vector processor according to claim 32, further comprising:

a controller associated with the vector registers and responsive to program instructions to successively transmit a corresponding element from each one of two vector element registers and a corresponding bit from the vector carry register to the functional unit and to successively store results from the output of the functional unit as elements into one of the plurality of vector element registers and as bits into the vector carry register.

* * * * *

UNITED STATES PATENT AND TRADEMARK OFFICE
CERTIFICATE OF CORRECTION

PATENT NO.    : 6,295,597 B1
DATED         : September 25, 2001
INVENTOR(S)   : William T. Moore, Jr. and David R. Resnick It is certified that error appears in the above-identified patent and that said Letters Patent is hereby corrected as shown below:

Column 4,
Line 32, paragraph beginning with "Thus, in this embodiment,..." should be part of the previous paragraph beginning with "It should be realized that, in one embodiment,..."
Line 58, delete "1025th" and insert -- $2^{1025}$ -- therefor.
Line 60, delete "1025 th" and insert -- 1025th -- therefor.

Column 5,
Line 27, delete "Ioaded" and insert -- loaded -- therefor.

Signed and Sealed this

Sixteenth Day of December, 2003

JAMES E. ROGAN
*Director of the United States Patent and Trademark Office*